United States Patent [19]

Runion et al.

[11] Patent Number: 4,583,758

[45] Date of Patent: Apr. 22, 1986

[54] MOBILE BODY SUPPORT VEHICLE

[75] Inventors: Brett H. Runion, 5 Chapel Oak Rd., Pittsburgh, Pa. 15238; Brian A. Novak, Hermitage; Gary Horne, Glenshaw, both of Pa.

[73] Assignee: Brett H. Runion, Pittsburgh, Pa.

[21] Appl. No.: 707,081

[22] Filed: Mar. 1, 1985

[51] Int. Cl.[4] .................... B62B 7/06

[52] U.S. Cl. .................... 280/644; 280/647; 297/45; 297/443

[58] Field of Search .................... 297/31, 45, 59, 313, 297/337, 440, 441, 443; 280/641, 642, 644, 647, 648, 650

[56] References Cited

U.S. PATENT DOCUMENTS

| | | | |
|---|---|---|---|
| 873,196 | 12/1907 | Willets | 280/642 |
| 2,546,493 | 3/1951 | Booth | 280/648 |
| 3,398,974 | 8/1968 | Edwards et al. | 280/289 |
| 3,538,522 | 11/1970 | Adams | 297/441 X |
| 3,887,228 | 6/1975 | Ingerson | 297/39 |
| 4,045,051 | 8/1977 | Igarashi et al. | 280/644 |
| 4,076,269 | 2/1978 | Muguruma | 280/218 |
| 4,166,631 | 9/1979 | Sanaski | 280/242 |
| 4,204,588 | 5/1980 | Kawecki | 188/2 |
| 4,264,085 | 4/1981 | Volin | 280/289 |
| 4,310,167 | 1/1982 | McLaurin | 280/5.28 |
| 4,322,093 | 3/1982 | Otto | 280/650 |
| 4,323,133 | 4/1982 | Williams | 180/65 R |
| 4,339,013 | 7/1982 | Weigt | 180/6.5 |
| 4,350,227 | 9/1982 | Knoche | 188/2 |
| 4,538,829 | 9/1985 | Horowitz | 280/641 |

*Primary Examiner*—John J. Love
*Assistant Examiner*—Michael Mar
*Attorney, Agent, or Firm*—Buell, Ziesenheim, Beck & Alstadt

[57] ABSTRACT

A mobile body support vehicle has a collapsible tubular frame. The frame includes longitudinally extending members formed by interconnected front in rear portions and transversely extending front intermediate bars and rear cross interconnecting the longitudinal members. The longitudinal members include detachable unions between the front and rear portions allowing the front and rear portions to be connected together and disconnected. The unions are each positioned substantially within a common plane oriented transversely with respect to the longitudinal members. The vehicle includes a front and rear pair of spaced apart wheels which are pivotally mounted to opposite sides of the frame and a pair of spaced apart intermediate wheels which are mounted on opposite sides of the frame at a location between the front and rear wheels. The intermediate wheels are larger than the front and rear wheels and include circumferential hand gripping members allowing the user to propel and control the vehicle. Fabric is stretched over the frame to form a surface adapted to receive and support a user's body. In the preferred form of the invention, the tubular frame is fabricated from polyvinylchloride piping and connectors.

12 Claims, 7 Drawing Figures

Fig. 6.
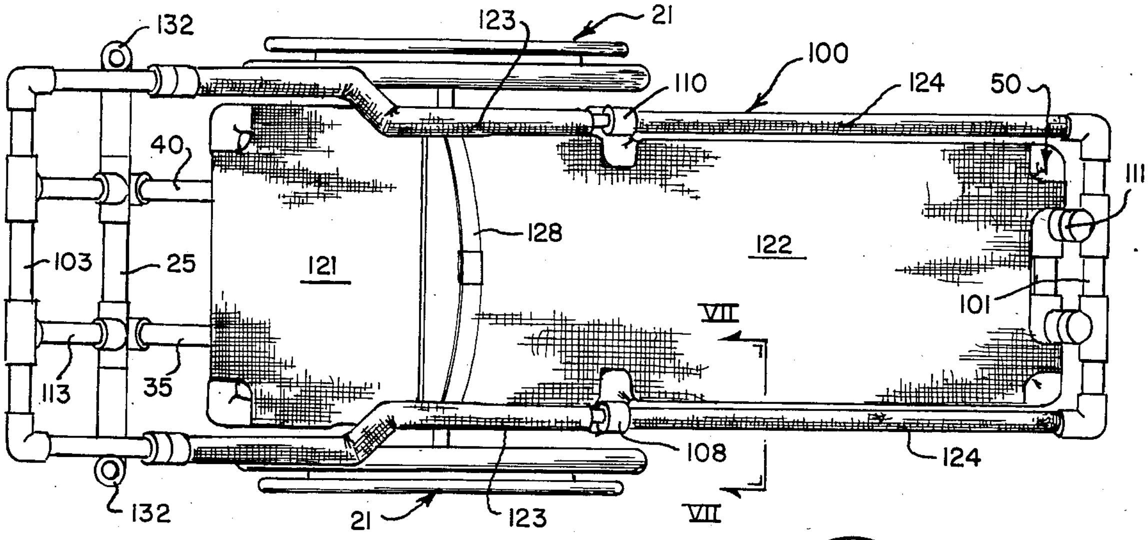
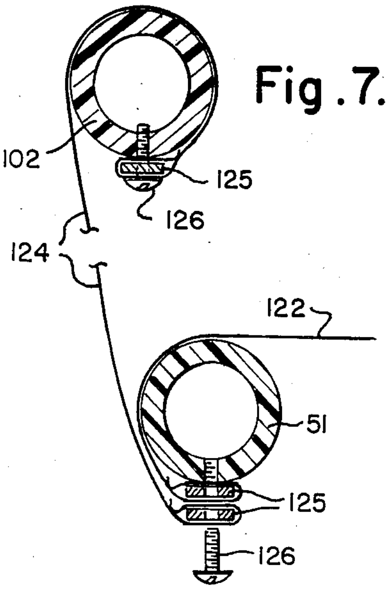
Fig. 7.
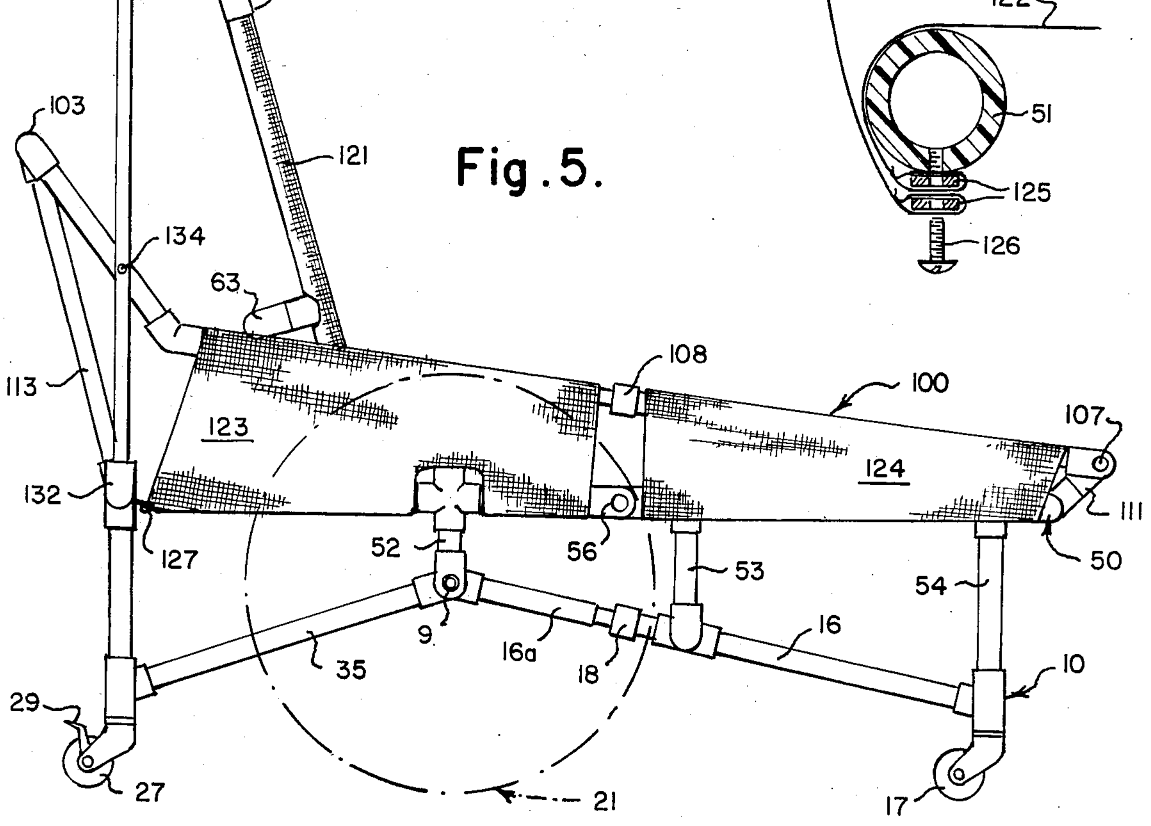
Fig. 5.

MOBILE BODY SUPPORT VEHICLE

BACKGROUND OF THE INVENTION

I. Field of the Invention

This invention relates to a Mobile Body Support Vehicle including a collapsible tubular frame, preferably formed from sections of polyvinylchloride piping. More specifically, longitudinally extending frame members are provided with detachable union couplings between front and rear portions thereof allowing the frame to be collapsed for compact storage. This type of vehicle can be used to transport a patient in either a prone or seated position.

II. Description of the Prior Art

Various types of body support vehicles are known. Wheelchairs are perhaps the most common type of support vehicle. A major limitation of wheelchairs is that most of them will only allow the patient to be transported in a seated position. If the patient must be kept in a prone position one must use a gurney or bed having castors on its legs.

Hospitals have long been concerned about storage of body support vehicles when they are not in use. Because space is limited, hospitals have generally preferred support vehicles which are collapsible for storage. The prior art has developed several types of collapsible body support vehicles. U.S. Pat. Nos. 4,045,051; 4,264,085 and 4,323,133, for example, disclose collapsible wheelchairs which fold transversely. Patients cannot be transported in these chairs while in a prone position.

U.S. Pat. Nos. 3,887,228 and 4,322,093 disclose collapsible wheelchairs which fold in a manner similar to a lawn chair. These devices require a plurality of pivotal connections which result in increased complexity and reduced strength. These chairs also cannot be used to transport patients in a prone position.

Consequently, hospitals have typically used gurneys for patients who must lie while being moved. These devices are generally large and cumbersome and not collapsible for storage. Another problem with many gurneys is that they do not permit the upper torso of a patient to be supported in a seated position. Because gurneys often do not have side rails they are not ideal for transporting children who tend to roll around. Finally, most gurneys today are relatively expensive.

There is a need for a body support vehicle in which a patient may be transported in a prone position or while his upper torso is supported in a raised position.

There also remains a need for a collapsible mobile support vehicle which has increased stability and maneuverability over the vehicles of the above-identified patents. There further remains a need for such a vehicle which may be fabricated for a low cost, have a reduced weight and increased strength.

SUMMARY OF THE INVENTION

The present invention has overcome these needs by providing a mobile support vehicle which has a collapsible tubular frame that is preferably formed from a plurality of interconnected segments of polyvinylchloride (hereinafter "PVC ") pipe. Our vehicle is generally comprised of a subframe, a body support frame located above the subframe and a side wall support frame located above the body frame. The subframe includes longitudinally extending members formed by interconnected front and rear portions and transversely extending front and rear cross members interconnecting the longitudinally extending members. A detachable coupling means between the front and rear portions to allow the front and rear portions to be connected together and disconnected as desired thereby making the subframe collapsible. The body frame is generally U-shaped with new rails pivotally attached to either end so that a portion of the frame may be folded. The side rail frame is generally rectangular with couplings provided in each of two opposite sides. The couplings of the side rail frame and the subframe are positioned substantially within a common plane such plane being oriented transversely with respect to the longitudinally extending members.

A pair of spaced apart front wheel means, preferably castors, are pivotally mounted to the subframe for rotation at opposite sides of the front cross member. Also, a pair of spaced apart rear wheel means are pivotally mounted to the subframe for rotation at opposite sides of the rear cross member. Therefore, wheels are provided at each corner of the frame for increased stability and maneuverability. A pair of spaced apart intermediate wheels are mounted to opposite sides of the subframe at a location between the front and rear wheel means. The intermediate wheels are much larger than the front and rear wheels and include a hand gripping means allowing the user of the vehicle to propel and control the vehicle with his hands. Fabric is stretched across and attached to portions of the body frame to create a bed surface adapted to receive and support a user's body. Fabric is also stretched between side rails of the side rail frame and the body frame of the vehicle to provide side walls adjacent to the bed surface. The side walls and bed surface together create partially enclosed, crib-like environment in which a patient can move or roll around without falling from the vehicle. We prefer to reinforce the fabric over that portion against which the patient's seat would rest.

In the preferred embodiment of the present invention, the rear wheels are provided with braking means. The intermediate wheels are preferably spokeless and are formed by casting from a suitable rigid material such as plastic. Each of the wheels preferably include an outer layer of rubber attached to their outer circumferential surface to reduce scuffing of floors on which the vehicles travel.

The frame of the preferred embodiment of the present invention also includes a pivotally mounted back rest portion allowing for adjustment thereof between sitting, reclining and flat positions. Locking means are provided to hold the back rest in each selected position. The frame also preferably includes a seat belt positioned to secure a user's waist. We also prefer to attached a rack for an IV bag. This rack is sized to hold the bag above and beyond the reach of the patient.

Finally, it is preferred that at least one of the fabric means and the intermediate wheel means are formed of a colored material in accordance with a coloring scheme to identify a particular hospital floor or other location where the vehicle is to be stored.

It is an object of the present invention to provide a lightweight mobile body support vehicle which is created from durable and sturdy construction materials.

It is another object of the invention to provide a mobile body support vehicle which has increased stability and maneuverability.

It is yet another object of the invention to provide a mobile body support vehicle which is inexpensive to manufacture and which requires a minimum of maintenance and upkeep.

It is yet another object of the invention to provide a mobile body support vehicle which includes a tubular frame which is collapsible for compact storage.

It is still another object of the invention to provide a mobile body support vehicle which preferably includes a frame constructed of interconnected sections of PVC piping.

It is yet another object to provide a mobile body support vehicle which includes fabric means, preferably in the form of a polyester mesh fabric, which is attached to portions of the frame to create a surface adapted to receive and support a user's body.

It is still another object of the invention to provide a mobile body support vehicle which is comfortable to children and permits a child to roll and move around on the vehicle without falling and to carry his toys with him.

These and other objects and advantages of the present invention will be more fully understood upon reference to the appended figures and description of the preferred embodiments of the invention.

BRIEF DESCRIPTION OF THE FIGURES

FIG. 5 is a side elevational view of the mobile support vehicle according to the present invention showing the frame of FIG. 1 with attached intermediate wheel and fabric.

FIG. 6 is a top plan view of the mobile support vehicle of FIG. 5.

FIG. 7 is a fragmentary cross sectional view along the lines VII—VII of FIG. 6.

DETAILED DESCRIPTION OF THE PREFERRED EMBODIMENTS

Figure 2:
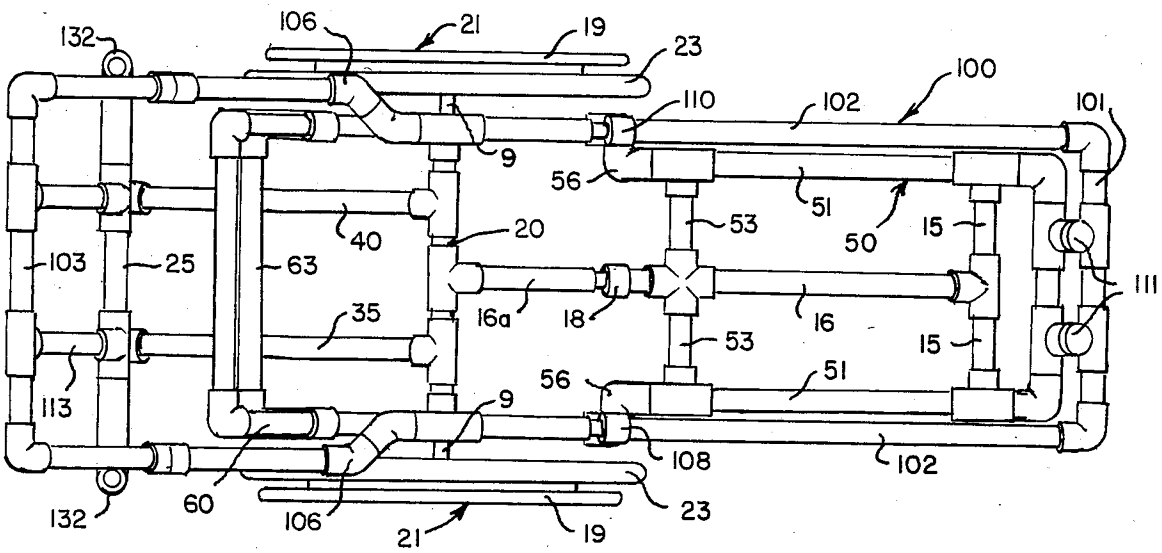
FIG. 2 is a top plan view of the vehicle frame of the embodiment of FIG. 1.

The mobile support vehicle of the present invention includes a three-tier tubular frame which is preferably fabricated from sections of polyvinylchloride (PVC) pipe which are interconnected by suitable connections in the form of tees, elbows, crosses and detachable couplings. These connectors are clearly shown in the drawings but not all of them are individually numbered. The pipe sections and connections are joined together with a suitable glue such as epoxy. We prefer to use one-inch diameter round PVC, schedule 80 pipe. However other sizes, gauges, and shaped pipe can be used.

Figure 1:
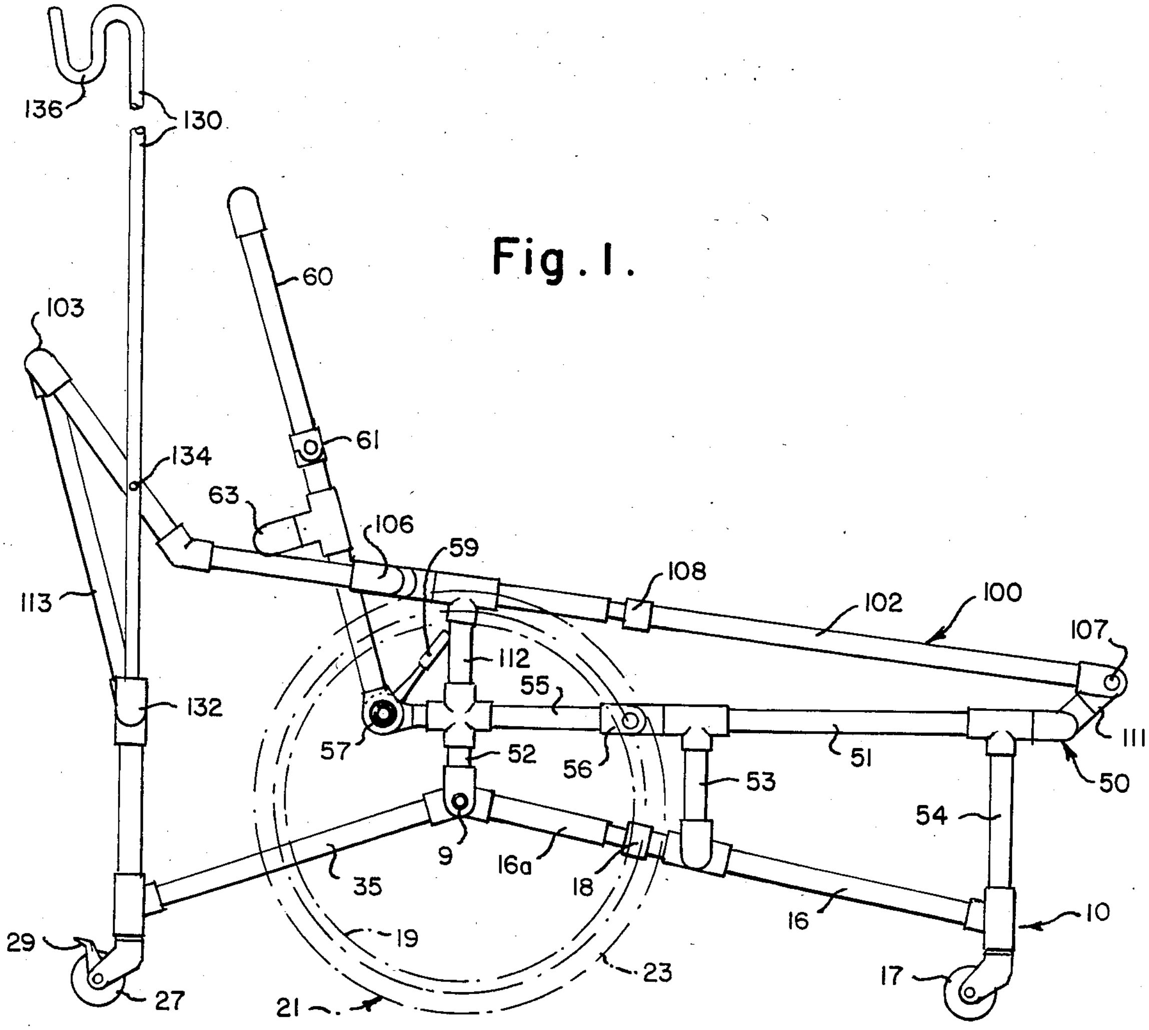
FIG. 1 is a side elevational view of a present preferred embodiment of our body support vehicle frame without its fabric cover and with the intermediate wheel shown in chain line.
Figure 3:
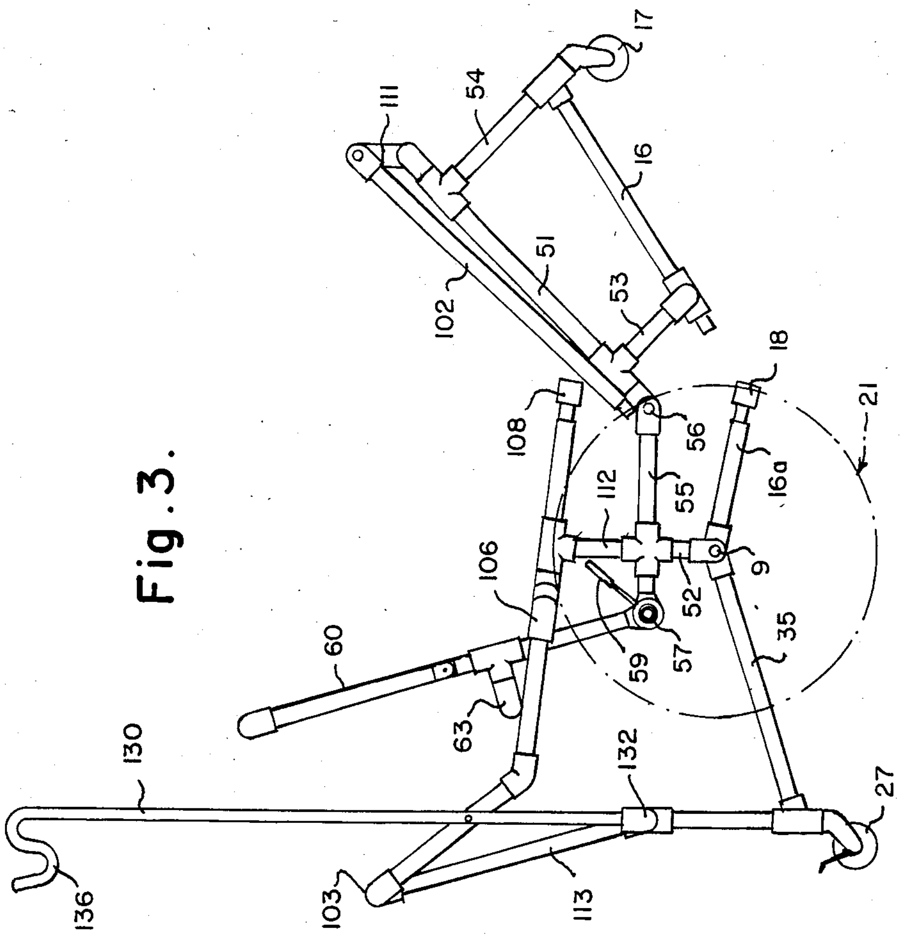
FIG. 3 is a side elevational view similar to FIG. 1 showing the frame partially collapsed.

Referring specifically to FIGS. 1 through 3, the frame, in its preferred form, includes interconnected subframe 10, body frame 50 and side wall support frame 100 which are provided on three vertically spaced apart generally horizontal levels.

Subframe 10 includes a transversely oriented front cross bar member 15, intermediate cross bar member 20 and a rear cross bar member 25. Intermediate cross bar 20 and rear cross bar 25 are interconnected by spaced apart longitudinally extending frame members 35 and 40. Front cross bar 15 and intermediate cross bar 20 are interconnected by a longitudinally extending frame member comprised of sections 16 and **16*a*, a detachable coupling 18 is provided to connect sections 16 and 16*a*. We prefer to use a quick release coupling here because of its spring biased collar. If the coupling is spring biased at least a portion of the coupling can be retracted making reassembly relatively simple. By uncoupling union 18**, the subframe may be collapsed.

A pair of spaced apart front wheels 17 and a pair of spaced apart rear wheels 27 are mounted at opposite ends of front cross bar 15 and rear cross bar 25 respectively. Wheel means 17 and 27 are each pivotally mounted for rotation and wheel means 27 are preferably provided with a suitable braking means 29. We prefer to locate these wheels directly below the side rails of body frame 50 for maximum stability.

A pair of spaced apart intermediate wheels means 21 are mounted for rotation on axle 9 at opposite ends of intermediate cross bar 20. Wheel means 21 are considerably larger than wheel means 17 and 27 and are preferably formed from molded plastic to increase their strength and eliminate the maintenance associated with spoked wheels. Wheel means 21 are preferably provided with a solid non-scuff rubber outer wheel layer 23 around their outer circumferential surface. Additionally, a circumferential hand gripping means 19 is also attached to each wheel means 21.

From the foregoing it can be seen that the present invention provides a subframe 10 which has wheels mounted at each corner thereof with larger intermediate wheels attached to opposite sides of the subframe at a location between the front and rear wheel means. This arrangement provides a vehicle with increased stability and maneuverability over existing body support vehicles.

A body frame 50 is mounted above subframe 10. The body frame 50 is comprised of a U-shaped portion 51 attached to the subframe 10, by support members 52, 53 and 54. Joints 56 are provided at one end, of U-shaped portion 51 to couple this section to rear rail portions 55 and permit this section to fold back onto rails 55. Alternatively, one could substitute couplings for these joints so that the U-shaped portion 51 could be folded onto rails 55 when the couplings are released.

The body frame also includes a pivotally attached U-shaped back portion 60. The ends of back portion 60 are pivotally attached to side rails 55. This pivotal attachment of back portion 60 to side rails 55 which form the rear portion of body frame 50 allows the back portion to be positioned in a prone, reclining or sitting position. We prefer to provide a brace 63 across the midsection of the back rest. We prefer to provide a spring loaded latch 57 which holds the back portion in each selected position. Lever 59 is used to release the latch 57. Alternatively, back rest portion 60 of the body frame may be supported in a prone, reclining or sitting position by a U-shaped back rest support member (not shown) which is pivotally attached to subframe 10. Another pivot joint 61 can be provided in the back rest to permit further adjustments.

Side wall frame 100 is positioned above body frame 50. Frame 100 is generally rectangular in shape and is formed by transversely extending front and rear cross bar members 101 and 103 and by interconnecting spaced apart longitudinally extending side members 102. We prefer to have side rails 102 turn outwardly at 106 to permit us to use a wider back rest 60. Detachable couplings 108 and 110 are provided along the lengths of frame 100 allowing for detachment of forward portion of the frame from its rear portion. Frame 100 is supported above body frame 50 by spaced apart front support members 111, intermediate members 112 and rear members 113. This frame 100 supports the side walls. It is not needed if no side walls are desired.

We also prefer to provide a rack 130 for holding an IV bag above and beyond the reach of the patient. This rack is a tube fitted into coupling 132 and bolted to the side rail frame at 134. A hook 136 is provided to hold the IV back. If desired this rack could be U-shape and attached at either side of the frame.

Figure 4:
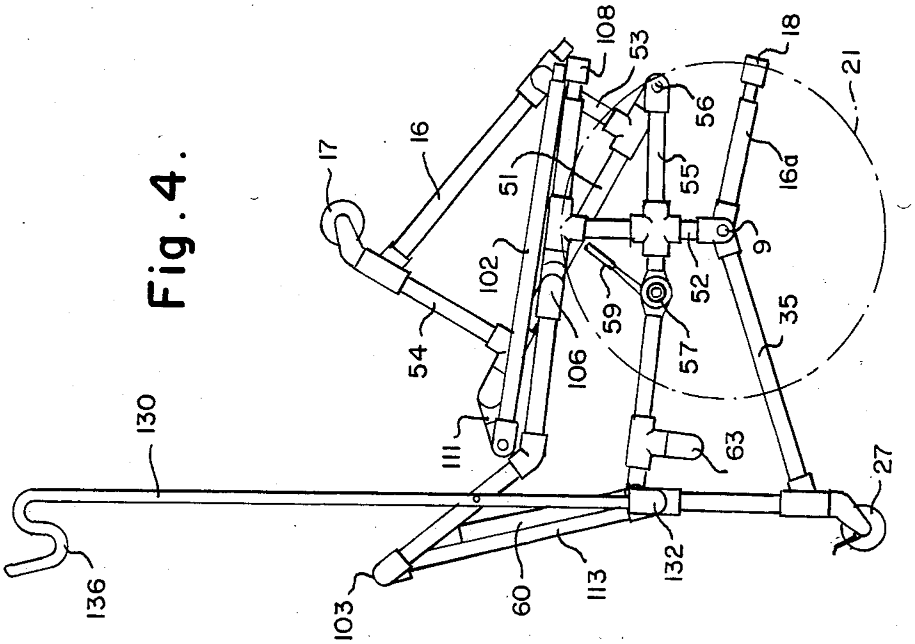
FIG. 4 is a side elevational view similar to FIGS. 1 and 3 showing the frame fully collapsed.

As shown in FIGS. 3 and 4 when detachable couplings 18, 108 and 110 are uncoupled, the front portions of subframe 10, body frame 50 and side wall frame 100, which are each interconnected by supports 111, 53 and 54 may pivot upwardly and thereby collapse the entire frame to approximately one half of its original length. For ease in folding, moving, and compact storage side rails 102 pivots at joint 107.

Referring now to FIGS. 5 and 6, the location and configuration of fabric means is shown. We prefer to provide a fabric covering which is made from a vinyl polyester mesh, such as the type sold under the brand name Textilene. As shown in FIGS. 5 and 6, three basic fabric sections are provided. These sections are the back support section 112 and 122 and side walls 123 and 124. A single sheet of fabric may be used for each section or each section may be formed from a plurality of smaller sheets. As shown in FIGS. 5 and 6, segments 121 and 122 are generally rectangular in shape and are wrapped around and connected to the body frame 50. We prefer to make both the back support and the side walls in two sections as shown. It is possible to make each of the back support and the side walls from one piece of fabric. These three sections may also be sewn together to form a single piece of fabric. We further prefer to reinforce that portion of the back support section 122 against which the seat of the patient will rest. Side wall segments 123 and 124 are stretched between side members 102 and body frame 50 as shown. A seat belt 128 is preferably provided to secure the patient to the vehicle at his waist. This arrangement creates a pocket-like structure which will aid in securing a user within the vehicle. It is especially useful for children who can move around without fear of falling. If a child wishes to carry his toys with him the side walls will prevent them from being dropped from the cart.

The cross-sectional view of FIG. 7 illustrates our preferred method of securing fabric to the frame. The fabric is wrapped around the pipe and held in place by bars 125 which extend the length of the fabric. Screws 126 are provided to secure the bars 125 to rails 51 and 102. Eyelets are cut in the fabric through which the bolts may pass. This method is used wherever the fabric is joined to the frame along a line.

Another method of attaching fabric to the frame piping is to utilize a plurality of eyelets in conjunction with plurality of rope sections. We use a single eyelet and rope 127 to secure the fabric side walls to the rear of the frame as shown in FIG. 5. Both techniques enable the user to easily remove the fabric from the frame.

From the foregoing it can be see that the present invention provides a lightweight and durable plastic tubing frame. The frame, while being rigid, does provide some flexibility which allows it to withstand greater pressures than other types of structures. It is estimated that the frame of the vehicle shown in the drawings can safely support approximately 600 pounds. The fabric covering which is provided over the frame also has the same pressure withstanding capabilities as the piping. It is also lightweight and equally durable. By providing a tubular frame having three unions provided in longitudinally extending members, the vehicle can easily be collapsed thereby cutting the length thereof by approximately one-half. Because of the particular choice of materials and design structure, the present invention provides a body support vehicle which is considerably lighter than other known vehicles and which provides increased strength.

Upon impact, the frame of the present invention is resistant to breakage, chipping or collapse because the plastic is somewhat flexible. The stretched material fabric means conforms to the user's body creating a comfortable support for the user and eliminating the need for additional padding.

The rear wheel means of the present invention are provided with brakes to prevent the cart from rolling away while a user gets in or out. A seat belt is also preferably provided for support and safety.

Because of the vehicle's reduced weight, it is considerably easier to maneuver, especially for small children with limited strength capabilities.

While we have illustrated and described certain present preferred embodiments of the invention, it is to be understood that the invention is not limited thereto and may be otherwise variously practiced within the scope of the following claims.

We claim:

1. A collapsible mobile body support vehicle comprising:

(a) a subframe comprised of a longitudinal support member having at least two segments connected by a releasable coupling, a front cross bar attached to one end of said longitudinal support member and a rear cross bar attached to the opposite end of said longitudinal support member, and intermediate cross bar attached to said longitudinal support member between said front cross bar and said rear cross bar, at least one wheel pivotably attached to the front cross member and at least one wheel pivotably attached to the rear cross bar;

(b) a body frame comprised of a generally U-shaped front segment positioned above said subframe, a pair of rear side rails pivotably connected to said front segment at its ends, a rear support connecting said rear side rails to said intermediate cross bar, and a front support connecting said U-shaped frame to said front crossbar wherein said pivotable connections are positioned relative to said subframe releasable coupling so that when said coupling is released said U-shaped front segment may be folded back over said rear side rails and over a portion of said subframe;

(c) a pair of intermediate wheels mounted to either side of said subframe along an axis generally parallel to said intermediate cross bar and between said front bar member and said rear cross bar; and (d) fabric attached to said body frame to form a surface adapted to receive and support a user's body.

2. The body support vehicle according to claim 1 also comprising:

(a) a side wall support frame positioned above said body frame having a generally rectangular configuration formed of right and left generally parallel side rails attached to a pair of generally parallel end rails;

(b) a fabric right side wall attached to said right side rail and said body frame;

(c) a fabric left side wall attached to said left side rail and said body frame;

(d) a plurality of supports attached between said side wall support frame and said body frame for supporting said side wall support frame above said side body frame; and (e) a first releaseable coupling provided within said right side rail and a second releaseable coupling provided within said left side rail both couplings positioned relative to said subframe releaseable coupling so that when all releaseable couplings are uncoupled a portion of said side wall support frame, said U-shaped front segment of said body frame and a portion of said subframe and said front support section which is attached thereto may be folded back over said rear side rails.

3. The body support vehicle according to claim 1 wherein the body frame also comprises a generally U-shaped back rest pivotably attached at one end to one side rail and attached at another end to said other side rail.

4. The body support vehicle according to claim 3 also comprising a latch means attached to said back rest for holding said back rest in sitting, reclining and prone positions.

5. A vehicle according to claim 1 wherein said frame is formed from a plurality of interconnected polyvinylchloride pipes.

6. A vehicle according to claim 1 wherein said fabric is frame of a vinyl polyester fabric.

7. A vehicle according to claim 1 wherein said fabric means is attached to said frame by eyelet and rope means.

8. A vehicle according to claim 1 also comprising brake means connected to at least one wheel.

9. A vehicle according to claim 1 wherein said intermediate wheels are each cast of hard plastic.

10. A vehicle according to claim 1 wherein said wheel means include a layer of rubber attached to their outer circumferential surface.

11. A vehicle according to claim 1 wherein said body frame has seat belt means attached thereto.

12. A vehicle according to claim 1 wherein at least one of said fabric means and said intermediate wheel means are formed of a colored material in accordance with a coloring scheme to identify a location where the vehicle is to be stored.

* * * * *

UNITED STATES PATENT AND TRADEMARK OFFICE

CERTIFICATE OF CORRECTION

PATENT NO. : 4,583,758

DATED : April 22, 1986

INVENTOR(S) : Brett H. Runion et al.

It is certified that error appears in the above-identified patent and that said Letters Patent is hereby corrected as shown below:

In (57) Abstract, line 4, after "intermediate" remove "bars"; line 5, after "cross", insert -- bars --.

Column 1, line 63, ""PVC"" should read -- "PVC" --.

Column 6, line 61, after "front", insert -- cross --; after "bar," delete "member".

Signed and Sealed this

*Fifth* Day of *August 1986*

[SEAL]

*Attest:*

DONALD J. QUIGG

*Attesting Officer*

*Commissioner of Patents and Trademarks*